(No Model.) 2 Sheets—Sheet 1.
J. FLYNN & W. MUIRHEAD.
MACHINE FOR MOLDING AND CUTTING BUTTER.
No. 584,214. Patented June 8, 1897.
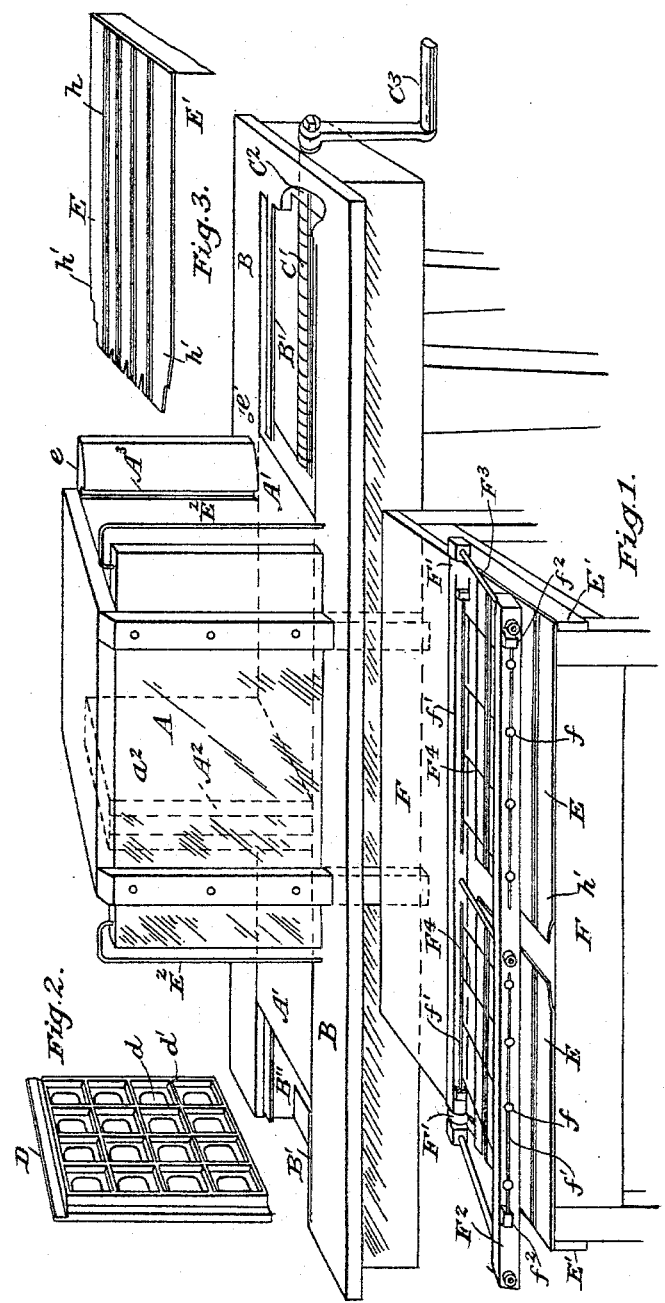
WITNESSES:
E. B. Bottom
E. A. Scott
INVENTORS:
John Flynn
Walter Muirhead
BY
ATTORNEYS.

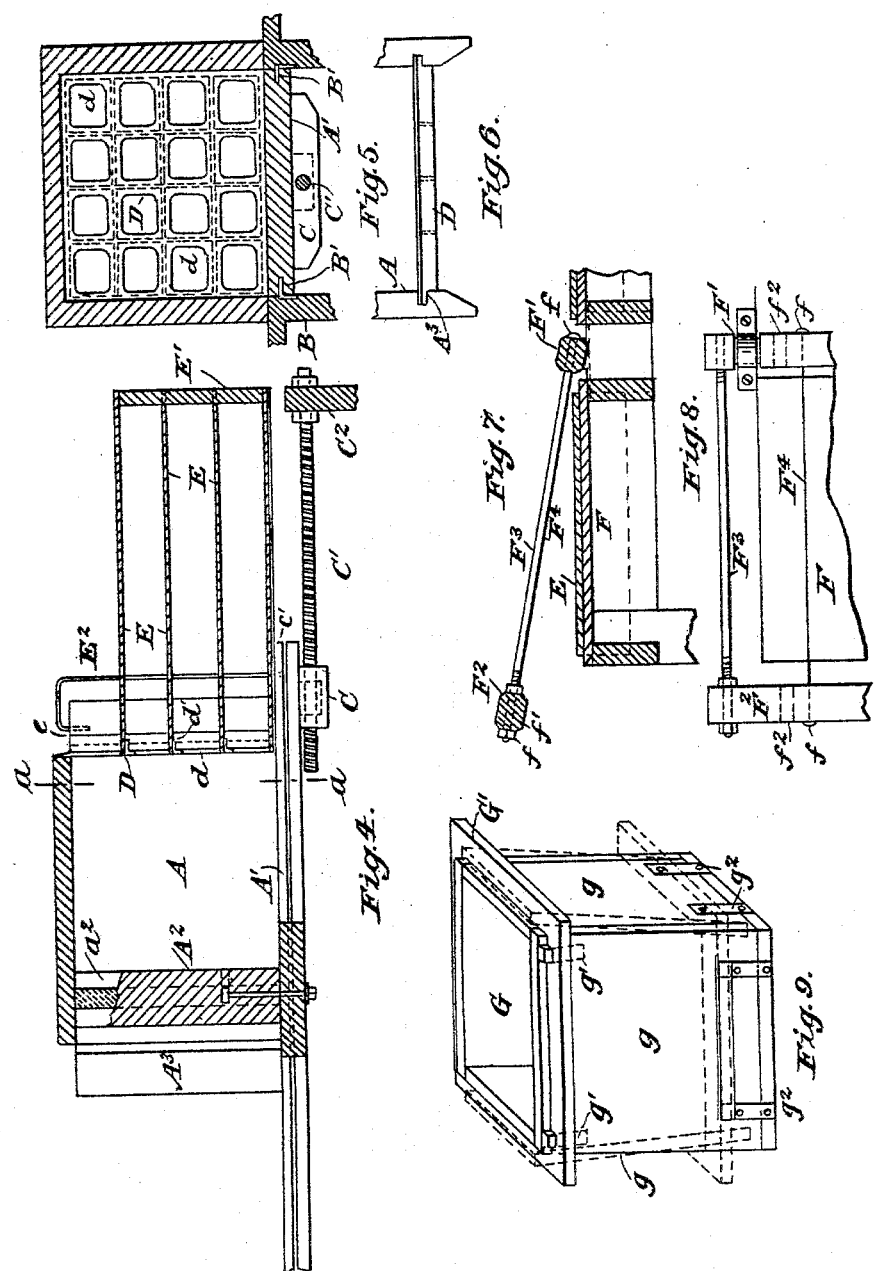

UNITED STATES PATENT OFFICE.

JOHN FLYNN AND WALTER MUIRHEAD, OF MELBOURNE, VICTORIA.

MACHINE FOR MOLDING AND CUTTING BUTTER.

SPECIFICATION forming part of Letters Patent No. 584,214, dated June 8, 1897.

Application filed October 16, 1896. Serial No. 609,126. (No model.)

*To all whom it may concern:*

Be it known that we, JOHN FLYNN, agent, and WALTER MUIRHEAD, agent, residing at No. 53 Oxford Chambers, Bourke Street, Melbourne, in the British Colony of Victoria, subjects of the Queen of Great Britain and Ireland, have invented a certain new and useful Improved Machine for Molding and Cutting Butter, of which the following is a specification.

This invention of an improved machine for molding and cutting butter is an improvement on the well-known type of machine wherein the butter is pushed or pressed forward within a closed box or cylinder by a screw acting directly on a piston or presser-plate arranged to slide therein and by which piston the butter is forced in the form of a bar or bars through one or more holes formed in the fore end of box or in a die secured thereon and delivered onto a tray.

Now this invention has been designed for the purpose of expediting the molding of butter by so constructing the press that butter supplied to it in suitable-size blocks may be molded into several tiers of bars at both the forward and backward movement of its combined sliding bottom and presser plate. The machine is therefore double-acting, as the press-box may be charged at one side of presser-plate while the butter at other side is being molded, and hence by this construction of machine no time is lost, as occurs when working existing machines, in having to return the presser-plate prior to recharging the press-box. Further, in order that the butter molded simultaneously into several tiers of rows or bars, lying one above the other, may be separated from each other, we furnish the machine with a corresponding number of horizontal trays or shelves, also arranged in tiers and with their inner ends abutting on the horizontal divisions between the several tiers or rows of holes in the die or mold plate. By having the trays arranged in tiers and practically the full area at each end of the press-box used as a die or mold plate each row of butter bars are delivered or laid upon a separate tray, in readiness for being cut crosswise to the requisite lengths or weights by a cutting device attached to the press-box.

The invention will now be described, aided by a reference to the accompanying sheets of drawings, in which—

Figure 1 is a perspective view of the machine with the die or mold plate and trays removed, the die or mold plate being shown by itself at Fig. 2 and one of the trays at Fig. 3; Fig. 4, a central longitudinal section through the press-box, combined sliding bottom or presser-plate, die or mold plate, and trays; and Fig. 5, a sectional view at line $a\,a$ of Fig. 4, while Fig. 6 is a top view of the die-plate in its working position; Fig. 7, a cross-section through the cutting-frame, and Fig. 8 a plan of its end part. Fig. 9 is a perspective view of the box or mold used for making the butter into blocks of a size suitable for the machine.

In constructing our machine the bottom of the press-box A is made in the form of a longitudinally-sliding plate A', grooved at each of its edges to fit upon slides, as B', carried by a table B. The length of said sliding bottom A' is fully double that of the press-box, and at the center of the sliding bottom we firmly secure a strong vertical plate $A^2$, which forms the presser-plate of our machine, and which press-plate has a cork packing $a^2$ placed in a groove at its top and two sides and fitting neatly between the top and sides of the press-box. Upon the under side of said sliding bottom plate A' we secure a strong square-threaded nut C, which receives a square-threaded screw-rod C', which is long enough to allow for the travel of the sliding bottom plate, and such screw-rod near its outer end is supported in a strong thrust-bearing $C^2$, secured to the end of the frame or table B of machine, while on its outer end the screw-rod is furnished with a suitable handle $C^3$, by which to rotate the screw.

The two sides of the press-box are firmly secured to the table or frame B, which supports the sliding bottom, and the top is in turn firmly secured upon the sides. Each end part of the sides of press-box is suitably arranged to support a die or mold plate D, and which latter has, as hereinbefore stated, a number of rows of holes $d$ in it corresponding to the number of horizontal trays E, said die or mold plate being either made of metal or wood and supported, as by grooves $A^3$, formed in sides of box, in order that the die or mold plate can be easily removed from one end of the press-box to the other. Furthermore, the holes or dies $d$ in the die-plate can be so formed as to deliver any running pattern on the surface of the butter bars or to mold them to any desired pattern, such as round or rectangular.

The aforesaid trays E are removable and employed at both ends of the press-box, the trays being supported at their ends which abut upon the die or mold plate either by resting upon ledges $d'$, formed on said die-plate, as shown in the drawings, or by passing into recesses in the die-plate or by forming slots in the ends of the press-box to receive the ends of the trays. The outer ends of the trays have transverse distance pieces or ledges $E'$ on them, which project downward and stand upon the end of the next tray below, the bottom trays alone being without the under ledge. $E^2$ is a pin or skewer passing through holes $h'$ in the trays and also into holes $e$ and $e'$ in the box and frame, respectively, and designed to hold the trays in position. $h$ are flutes or grooves formed on surface of trays to cause the butter bars when issuing to follow the grooves. If so preferred, in place of the wires $E^2$ the back ends of the trays may bear against a vertical prop or bracket suitably stayed and secured upon the table or frame in order to resist the frictional pressure of the butter bars while being delivered upon them.

F is the table carrying the frame used for cross-cutting the bars of butter to the requisite lengths or weights while upon the trays. The axial or hinge bar of cutting-frame is supported in bearings $F'$ upon said table, while the outer bar $F^2$ of frame is held apart by the adjustable-screw stay-rods $F^3$.

$F^4$ are the stretched cutting-wires, both ends of which are furnished with a head or collar $f$, the wires being slid to their positions through the slits or slots $f'$ in both bars of frame, holes $f^2$ being also provided, as shown, through the bars in order to pass the heads of the wires therethrough.

To form the butter into a suitable-size block for the machine, we employ the mold-box G, which has its four sides $g$ hinged at $g^2$ to the bottom plate, while fitting over the sides is a frame $G'$, which, when at its upmost position, as shown, Fig. 9, in full lines, fits hard upon the wedge-pieces $g'$ on two opposite sides and upon the other sides themselves and so securing them all together, while when the frame is down, or in the position shown by dotted lines, the sides are free to spring open enough to free the block of butter and allow of its being easily removed. The sides without the wedges are slightly farther apart at top than at their bottom in order to allow the frame $G'$ to free itself.

The mode of working our machine is as follows: A block of butter of suitable size is first placed upon the sliding bottom $A'$ close against the presser-plate $A^2$. Then by rotating the screw-rod $C'$ the butter is carried sufficiently far into the press-box A to allow the die or mold plate D to be placed in the grooves $A^3$ and the tier of trays E secured in position. The second block of butter is now placed in position on the sliding plate $A'$ at opposite side of the presser-plate $A^2$, and afterward the screw is rotated in the reverse direction, so as to carry the combined sliding and presser plate forward and so force the butter first placed in the machine through the die or mold plate and form it into several tiers of bars and which are delivered onto the several trays E. When the end of the stroke is reached, the pins $E^2$ are withdrawn and the trays with the butter bars upon them are lifted off and laid, as shown in Fig. 1, upon the table F of the cutting-frame, and when thereon, by dropping the cutting-wires $F^4$ of the frame upon them, they are cut into the desired weights or lengths. If desired, the trays may be laid at both sides of the hinged frame-bars, so that by overturning the frame the butter bars on four trays are cut, and practically at one operation. The other block of butter being now in the press-box, the die or mold plate D and trays E are placed in position at the opposite end of the press-box and the cycle of operations repeated.

It will be obvious that our machine may be made single-acting—that is, its sliding bottom may be shortened and be only long enough to receive and mold butter at one end of the box—and in such a case the screw may act directly upon the presser-plate; also the machine may be used for molding other plastic substances besides butter. Although we have described a screw rod and nut as being the medium for moving the sliding bottom plate, such may be accomplished by means of rack-and-pinion gear, or with ratchet-gear, or by means of a suitably-arranged lever, although we prefer the screw rod and nut, as herein set forth. Again, in order to press the butter bars out clear of the die or mold plate we may form recesses in the presser-plate to neatly fit and clear the divisions of said die-plate, so that the so-formed projections on the press-plate enter the dies or molds and force the butter-bars clean through them.

Having now particularly described and ascertained the nature of our said invention and in what manner the same is to be performed, we declare that what we claim is—

1. In combination, the table, the press-box A thereon comprising the sides, the sliding bottom moving between the sides, the die at the end of the box, and the presser-plate $A^2$ on the sliding plate moving between the sides of the box whereby said stationary sides will confine the butter as the presser-plate forces it to the die, substantially as described.

2. In combination, the press-box adapted to receive a mold or die plate at each end removably, a mold or die plate adapted to be inserted at each end of the box, a press-plate for pressing the material through the die and means for operating the press-plate located outside of the press-box, substantially as described.

3. In combination the press-box, consisting of the stationary sides, the press-plate moving between the sides, said sides being adapted to hold a die-plate at either end, the means for running the press-plate between the sides of the box said plate being adapted to press the butter through the die on either stroke, substantially as described.

4. In combination, the press-box having the stationary sides, a die-plate, means for pressing the butter through the die and a tier or series of removable trays one above the other to receive the butter from the die, substantially as described.

5. In combination the table, the press-box having the stationary sides, the sliding plate, the die and the press-plate moving from end to end between the side plates said press-plate being connected with the sliding plate and having a package in its edge to bear on the interior sides of the press-box, substantially as described.

6. In combination with the die, means for forcing the material therethrough and a tier or a series of trays one above the other corresponding to the divisions of the die to receive the butter therefrom, substantially as described.

7. In combination, the table, the press-box having means for holding a die-plate at each end, the press-plate moving in between the sides of the box, means for reciprocating the press-plate, the die removably held and to be fitted to either end of the box, and a removable series of trays adapted to either end of the box, the said means for operating the press-plate being located outside of the press-box, substantially as described.

8. In combination, the table, the press-plate, the mold or die plate having holes $d$ arranged in tiers and having also the ribs $d'$, and the trays arranged in tiers to engage the ribs of the mold-plate, substantially as described.

9. In combination, the table having the projecting end, the press-box thereon, the sliding plate $A'$ in the table and passing between the sides of the press-box, the mold or die plate at the end of the press-box, the tier of trays in rear of the die-plate, and the screw for operating the sliding plate, substantially as described.

10. In combination, the table F and the cutting-frame hinged thereto, said frame having slots extending longitudinally of the rails thereof with openings at the ends of said slots and the wires having headed ends the said heads being of such size as to go through the said openings but to be retained by the walls of the slots, substantially as described.

In witness whereof we have hereunto set our hands in presence of two witnesses.

JOHN FLYNN.
WALTER MUIRHEAD.

Witnesses:
W. STOKES,
BEDLINGTON BODYCOMB.